(12) United States Patent
Lin et al.

(10) Patent No.: US 11,985,165 B2
(45) Date of Patent: May 14, 2024

(54) DETECTING WEB RESOURCES SPOOFING THROUGH STYLISTIC FINGERPRINTS

(71) Applicant: International Business Machines Corporation, Armonk, NY (US)

(72) Inventors: Xu Lin, Chicago, IL (US); Frederico Araujo, White Plains, NY (US); Teryl Paul Taylor, Danbury, CT (US)

(73) Assignee: International Business Machines Corporation, Armonk, NY (US)

(*) Notice: Subject to any disclaimer, the term of this patent is extended or adjusted under 35 U.S.C. 154(b) by 390 days.

(21) Appl. No.: 17/551,563

(22) Filed: Dec. 15, 2021

(65) Prior Publication Data

US 2023/0188565 A1 Jun. 15, 2023

(51) Int. Cl.
*H04L 9/40* (2022.01)
*G06F 16/958* (2019.01)

(52) U.S. Cl.
CPC ........ *H04L 63/1483* (2013.01); *G06F 16/958* (2019.01); *H04L 63/1416* (2013.01)

(58) Field of Classification Search
CPC ... H04L 9/40; H04L 63/1483; H04L 63/1416; G06F 16/958
See application file for complete search history.

(56) References Cited

U.S. PATENT DOCUMENTS

| 9,954,893 | B1* | 4/2018 | Zhao ................... H04L 63/1466 |
| 10,339,362 | B2 | 7/2019 | Othman |
| 10,395,018 | B2 | 8/2019 | Turgeman |
| 11,050,793 | B2 | 6/2021 | Jeyakumar et al. |
| 11,924,234 | B2* | 3/2024 | Safruti ................... G06F 21/552 |
| 2020/0084225 | A1* | 3/2020 | McKendall ............. G06F 21/54 |

(Continued)

FOREIGN PATENT DOCUMENTS

| AU | 2014237025 A1 * | 10/2015 | .......... G06F 11/3065 |
| CN | 112769792 A * | 5/2021 | ........... H04L 63/123 |
| CN | 114553529 A * | 5/2022 | |

OTHER PUBLICATIONS

Azad, et al, "Web Runner 2049: Evaluating Third-Party Anti-bot services," DIMVA 2020.

(Continued)

*Primary Examiner* — Jayesh M Jhaveri
(74) *Attorney, Agent, or Firm* — Maeve M. Carpenter

(57) ABSTRACT

A method of detecting deceptive web activity is implemented in an intermediary located between a requesting client device, and a server that hosts a web application. Following a bootstrap phase used to generate a database of information identifying characteristics of clients, the method begins by receiving a page directed to the client from the server. The server injects an invisible DOM element having a set of style properties associated therewith, with one of the set of style properties assigned a random value, to generate a modified page, which is returned to the client. As the client interacts with the modified page, the intermediary tracks the device's styles and uses them to identify the client from information in the database. Once the device is identified, the intermediary then detects whether a spoofing attack has occurred. By leveraging the tracked styles, a spoofing attack on the DOM element's styles may also be detected.

21 Claims, 8 Drawing Sheets

(56) References Cited

U.S. PATENT DOCUMENTS

2023/0004637 A1* 1/2023 Wang ..................... G06F 21/53

OTHER PUBLICATIONS

Andriamilanto, et al, "Guess Who?" Large-Scale Data-Centric Study of the Adequacy of Browser Fingerprints for Web Authentication, arXiv:2005.09353.
"Advanced Cybercrime Tactics—Threats translate into crime. How do you stop them?", ThreatMetrix, Whitepaper, © 2014 ThreatMetrix, 11 pages.
"Intelligence from LexisNexis® ThreatMetrix® Helps French Retailer Cdiscount Better Detect Fraudulent Activity Across the Customer Journey, Dramatically Reducing Account Takeovers and Payment Fraud", LEXISNEXIS, 2021 LexisNexis Risk Solutions, NXR14746-00-0121-EN-US , 7 pages.
"Secure biometrics stops fraud across channels", NUANCE, Omni-Channel Customer Engagement, Data Sheet, Nuance Biometric Fraud Tools, Mar. 5, 2018, NUAN-CS-3016-02-DS, 2 pages.
Anonymous, "A Method and Apparatus for Configuring Security Policies for Browser-Based Attacks", An IP.com Prior Art Database Technical Disclosure, IP.com No.: IPCOM000167316D, IP.com Electronic Publication Date: Feb. 7, 2008, 15 pages.
Anonymous, "Method of preventing spoofing of sessions in a progressive web app", An IP.com Prior Art Database Technical Disclosure, IP.com No.: IPCOM000254891D, IP.com Electronic Publication Date: Aug. 10, 2018, 5 pages.
Anonymous, "Systems and Method for Preventing Automated Attacks", An IP.com Prior Art Database Technical Disclosure, IP.com No.: IPCOM000236521D, IP.com Electronic Publication Date: May 1, 2014, 7 pages.

* cited by examiner

DETECTING WEB RESOURCES SPOOFING THROUGH STYLISTIC FINGERPRINTS

STATEMENT OF GOVERNMENT RIGHTS

This invention was made with Government support under Contract No.: W1873664 awarded by the Army Research Office (ARO) for Project W911NF-13-2-0045. The Government has certain rights in this invention.

BACKGROUND OF THE INVENTION

Technical Field

This disclosure relates generally to securing resources in a distributed computing environment.

Background of the Related Art

Commercial anti-bot services rely primarily on browser fingerprinting to identify online bots. More recently, browser fingerprints have been incorporated into risk-based authentication techniques to limit account takeovers. Browser fingerprints, however, are easily spoofable, and there are numerous hacking tools, browser extensions, and anti-fingerprinting browsers available to manipulate the device fingerprints. As a result, attackers can easily bypass the security measures and impersonate legitimate users by lying about the device's identity. Other recent research has focused on analyzing how browser extensions are fingerprintable through the styles that they inject, but the approach only applies to extensions and does not provide a general anti-spoofing defense. As a result, existing browser fingerprinting solutions show limited effectiveness of anti-spoofing protection against determined attackers.

BRIEF SUMMARY

According to this disclosure, a device's true identity is determined using a device fingerprinting method, preferably based on Cascading Style Sheet (CSS) properties of Document Object Model (DOM) elements. The approach leverages the notion that browsers render DOM elements differently depending on the environment.

According to one aspect, a method of detecting deceptive web activity is implemented in an intermediary located between a requesting client device, and a server that hosts a web application or web site Following a bootstrap phase used to generate a database of information (or so-called "stylistic" fingerprints) identifying characteristics of clients, the method begins by receiving a page directed to the client from the server. The server then injects an invisible DOM element having a set of style properties associated therewith, wherein a given one of the set of style properties is assigned a random value, to generate a modified page. The modified page is then returned to the client. As the client interacts with the modified page, the intermediary tracks the device's styles and uses them to identify the client from the information in the database. Once the device is identified, the intermediary then detects whether a spoofing attack associated with one or more device attributes (e.g., including operating system, browser, browser version) has occurred. By leveraging the tracked styles, a spoofing attack on the DOM element's styles may also be detected.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
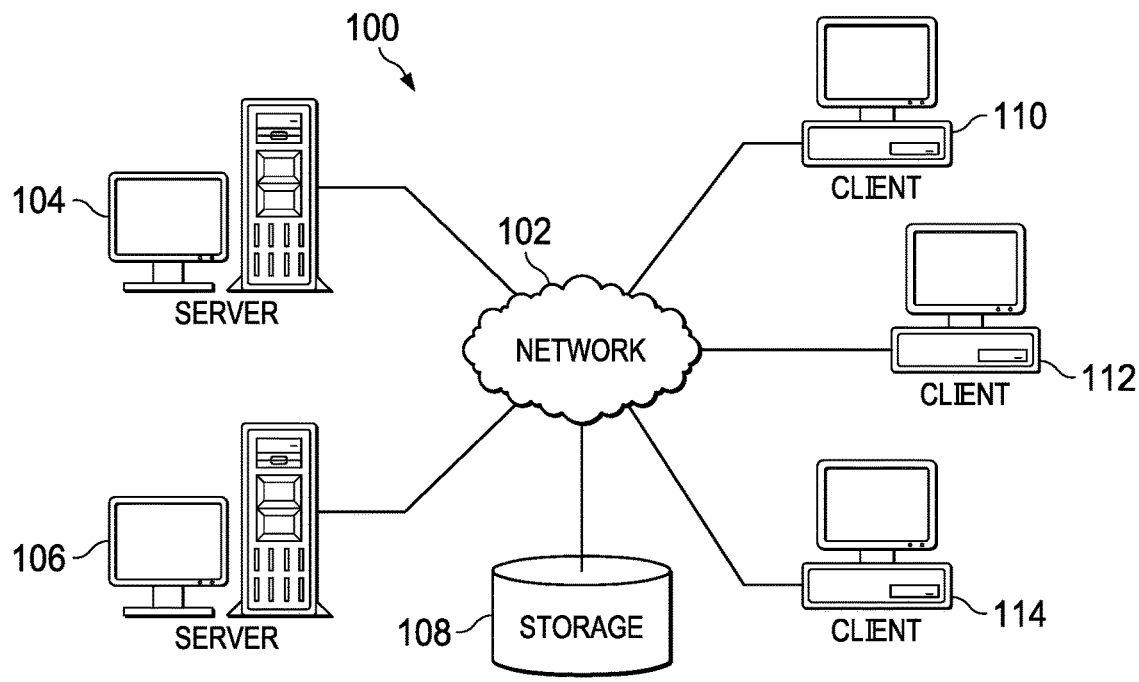
FIG. 1 depicts an exemplary block diagram of a distributed data processing environment in which exemplary aspects of the illustrative embodiments may be implemented.
Figure 2:
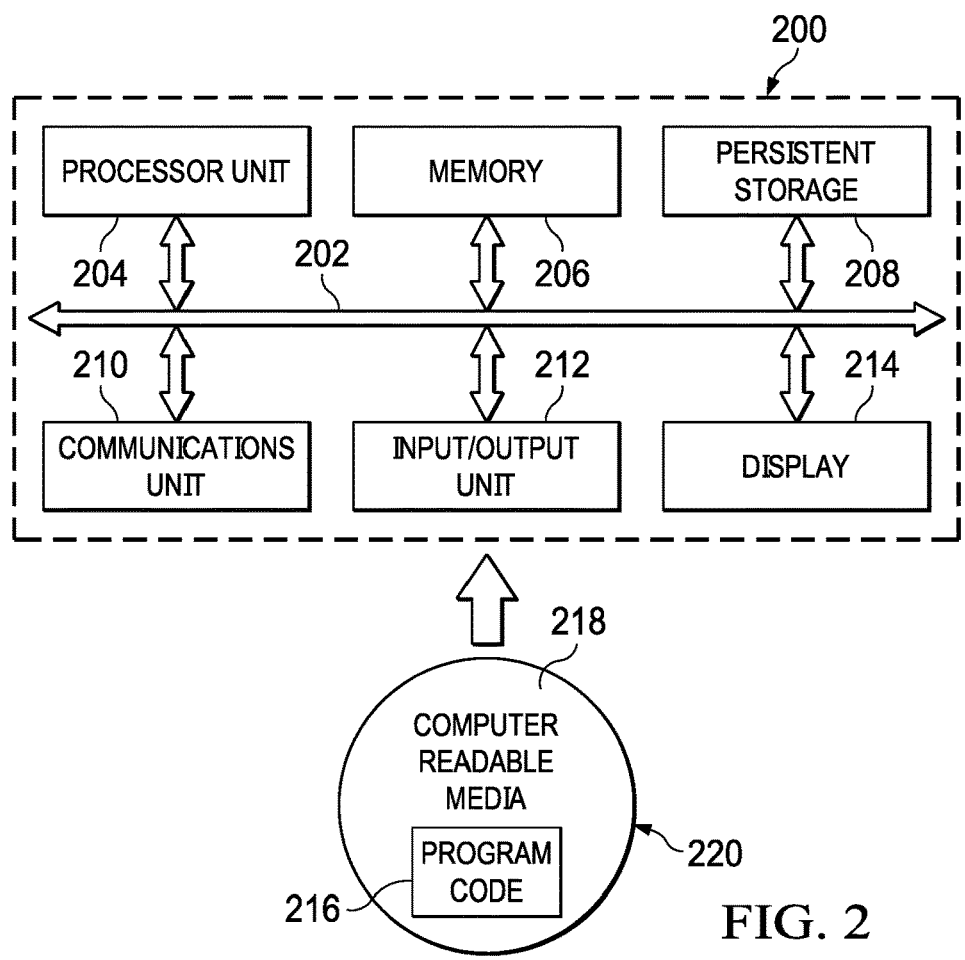
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the symmetric multi-processing (SMP) system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
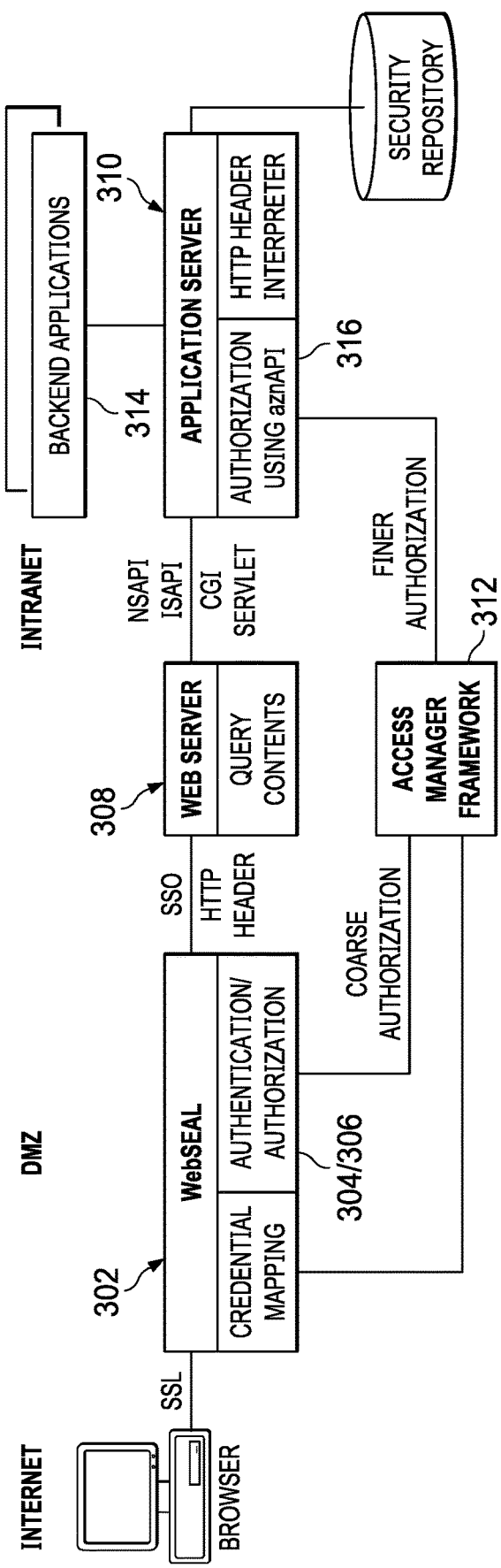
FIG. 3 illustrates a Web-based reverse proxy environment in which the techniques of this disclosure may be implemented.

By way of further background, a web-based application environment such as described above typically includes a session management component. Session management typically is provided in association with an access manager, which is a component that prevents unauthorized use of resources, including the prevention of use of a given resource in an unauthorized manner. A representative access manager is the IBM® Security Access Manager, which is available commercially from IBM, and is represented in FIG. 3. Of course, the identification of this commercial product is not meant to be taken to limit the disclosed subject matter. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. This component is responsible for the session management of users.

FIG. 3 illustrates how the access manager is integrated in a Web portal to provide authorization and access control services for Web resources. A high performance, multi-threaded Web server 302 (called WebSEAL in the figure), an access manager component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password, although other techniques may be used. An authentication function 304 provides this function. Authorization, in contrast, refers determines what resources an authenticated client can use. For example, a customer may only be able to access e-business applications from the Internet, whereas an employee might also be permitted to access corporate applications. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. This may be accomplished by placing a custom common gateway interface (CGI) script on the Web server. This script allows a management console to display and manage the Web space, or application space, of the Web and application servers. Preferably, the access manager framework 312 handles access control for static content and dynamic content. In particular, a utility may be used to place access control lists (ACLs) in components of applications, or in CGIs. By passing user and group information in HTTP headers, the application server 310 can make further access control decisions if required. The information passed from WebSEAL can also be used to access back end applications 314. In addition, for more fine-level authorization control, the access manager implements aznAPI 316, which as noted above allows an application to call out to an authorization service for authorization decisions. In this case, access manager identity information passed to the application server by an HTTP header can be used by aznAPI to make further fine-grained access control decisions, e.g., based on the specific internals of the application (and any authorization decisions enforced by the WebSEAL component 302). Information passed from WebSEAL and obtained from the access manager framework 312 can be used to make access decisions to back end applications.

The access manager provides a reverse proxy, web plug-in or the like that provides session management functionality and that includes authorization functionality as part of this session management. Authentication is handled by the access manager, meaning that the access manager collects a user's authentication credentials, evaluates them, and establishes a session, including some form of session management functionality (such as a session cookie). To provide a user with the advantages of this consolidated environment, the access manager then provides a single sign-on solution for the user by asserting authentication credentials (such as username/password) to the back-end applications. This allows the back-end application to be added to the portal environment without modification.

In a representative implementation, IBM WebSphere® Application Server provides embedded IBM® Security Access Manager client technology to secure WebSphere Application Server-managed resources. WebSphere Application Server supports the Java Authorization Contract for Containers (JACC) specification.

The above-described commercial solutions are not intended to be limiting, as any conventional reverse proxy (or other application) server may support the functionality of this disclosure, which is now described.

Device Fingerprinting

By way of further background, a growing number of websites and web applications use device fingerprinting for security. For example, and with reference to FIG. 4, it is known to provide commercial bot detection service 400 that relies on browser fingerprinting to identify on-line bots. In this solution, when a user running a web browser 402 visits a web server 404 (step (1)), fingerprinting scripts running in association with the browser gather information (e.g., about the client machine, the browser (user agent), the browser size, a number of plugins, types of permissions, etc.) and send it to the detection service 400 (step (2)). User interaction data with the website, such as login attempts and viewed data, may be sent to the detection service 400 (step (3)). The web server 404 queries the detection service 400 and, in response, the server receives a risk score (step (4)) indicative of whether the detection service characterizes the user as a human, or a bot. Based on the score and an applicable security policy, the web server takes a given security action, such as showing a CAPTCHA, limiting a number of requests, or blocking access.

Figure 5:
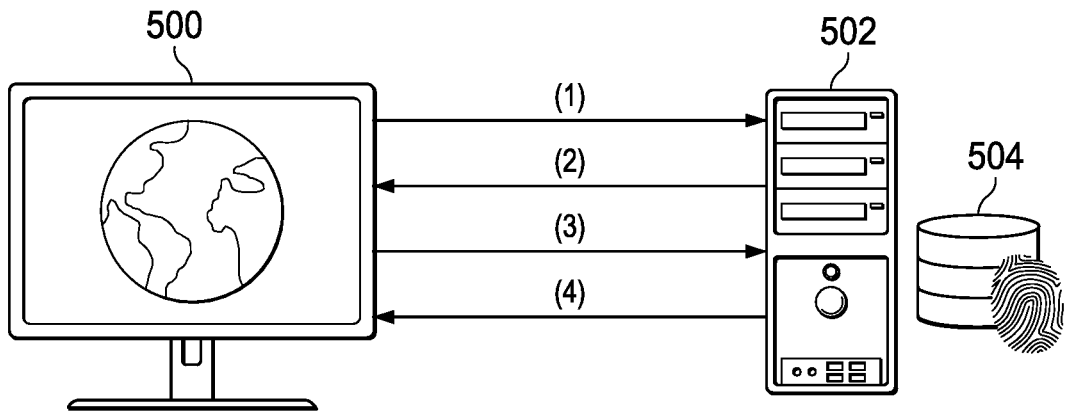
FIG. 5 depicts another known use of device fingerprinting for a web authentication service.

FIG. 5 depicts another use case for device fingerprinting involving web authentication. In this example, a client 500 interacting with a server 502 makes a request for a login page (step (1)). At step (2), the server 502 returns the login page that includes a fingerprint script. A user with a valid login credentials (e.g., user name and password) then logs into the web application. the script executes and collects additional data that is then processed into a fingerprint. The login, password and fingerprint are then returned to the server at step (3). At step (4), and based at least in part on evaluating whether the fingerprint matches against a user's profile in a fingerprint dataset 504, access to a protected resource associated with the server 504 is then granted or denied.

Figure 6:
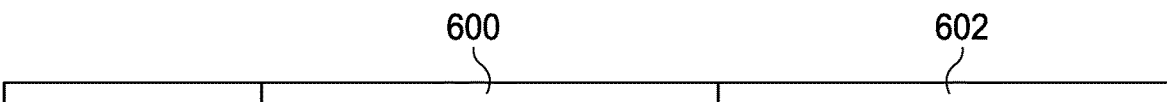
FIG. 6 depicts how an attacker can overwrite the results of running a fingerprint collection script.
Figure 7:
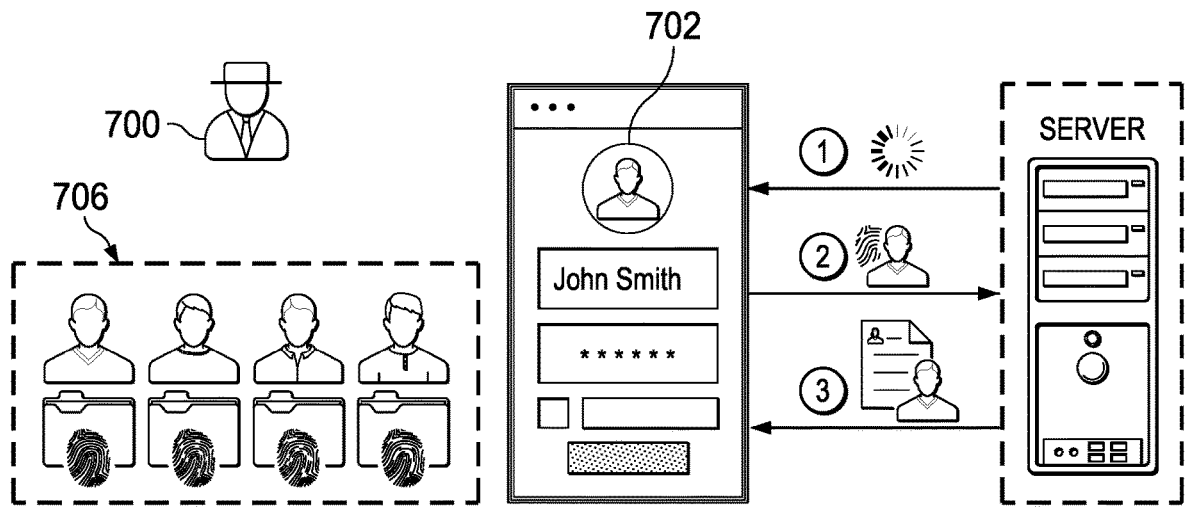
FIG. 7 depicts how the attacker obtains access to a user's private data by a fingerprint spoofing attack.

The above-described security checks, however, are vulnerable to spoofing attacks. This is because the device fingerprints are extracted by Javascript APIs, and attackers can readily override the returned values. FIG. 6 depicts an example scenario wherein an attacker spoofs the fingerprint by overwriting the User Agent, WebDriver, Chrome, Permissions, Plugins Length and WebGL Renderer values in a test result 600, thereby creating a spoofed set of values as indicted at 602. By rewriting the values, an attacker can make it appear as if the attacker's device fingerprint corresponds to some other fingerprint, such as the fingerprint associated with the user's actual browser. As a result, and as shown in FIG. 7, an attacker 700 who has stolen the user's credentials 702 receives the login page (step (1), and spoofs the legitimate browser fingerprint (step (2)) to bypass security checks, thereby tricking the website or web application 704 into believing that the user is legitimate. The server responds by providing the user's private data or other access to a protected resource (step (3)). In the typical scenario, the attacker obtains the user's fingerprint by setting up a dummy website or page; then, when the victim visits the site or page with his or her browser, the user's actual fingerprint is captured and automatically delivered to the attacker. FIG. 7 shows the attacker associated with a set of spoofed fingerprints 706 that have been collected in this manner.

Figure 4:
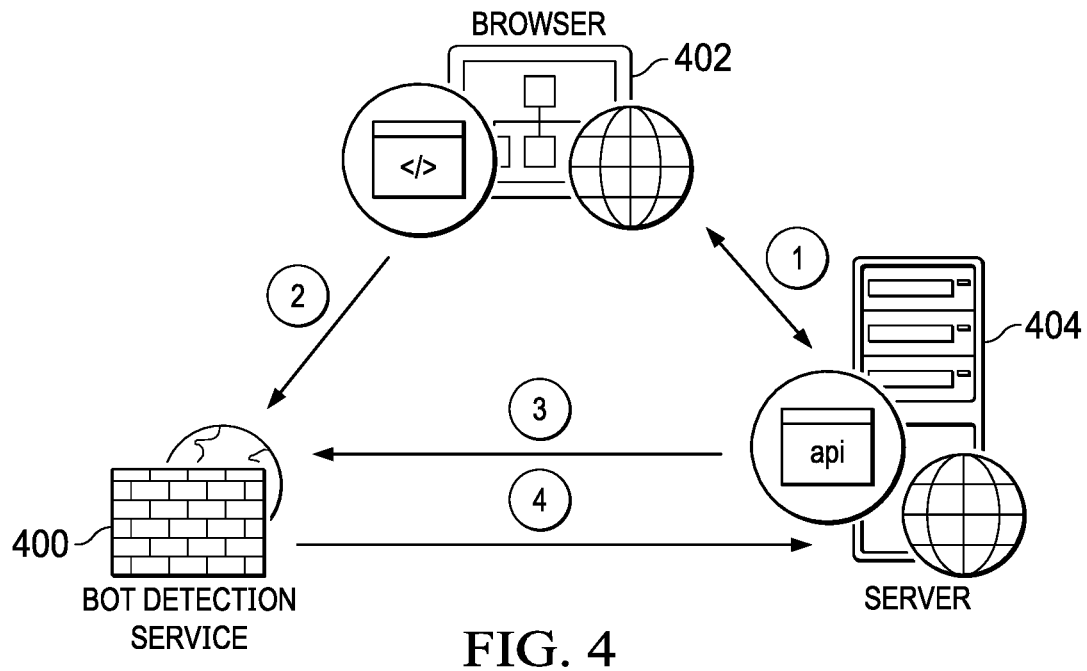
FIG. 4 depicts a known use of device fingerprinting for a bot detection service.

Conventional bot detection services, such as depicted in FIG. 4, just look for inconsistencies between device fingerprints (e.g., comparing screen.width with screen.avialWidth, or navigator.UserAgent with navigator.platform, and so on), but the attacker can evade this defense by spoofing all of the fingerprints. Another type of detection technique takes a native Javascript API and converts it into a data string (e.g., toString( ) to determine whether there is any change to the given function's code, but the attacker can evade this defense by directly overwriting the checking function.

Stylistic Fingerprinting and Spoofing Attack Detection

Figure 8:
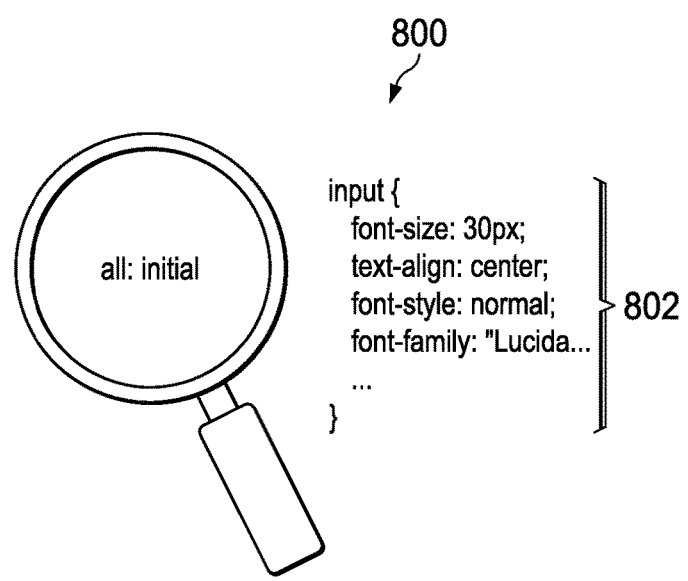
FIG. 8 depicts a stylistic fingerprinting technique of this disclosure wherein a text field element's Cascading Style Sheet (CSS) properties are used to facilitate data collection about a device.
Figure 9:
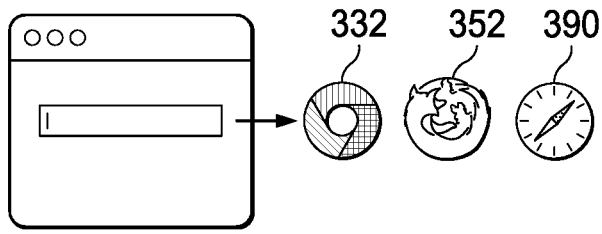
FIG. 9 depicts how different browser support disparate sets of CSS properties.

With the above as background, the techniques of this disclosure are now described. To address the above-identified problems, a much more robust technique to defend against spoofing attacks is provided. To this end, and with reference to FIG. 8, in one embodiment the technique leverages the notion that any particular DOM element, e.g., a text field (<input>) element 800, may have associated therewith hundreds of CSS properties 802. Any or all of these properties may be reset to their default value, e.g., using CSS rule all:initial. A set of CSS properties is sometimes referred to herein as a set of stylistic features or a stylistic dataset, and the technique herein is built upon the premise that the stylistic characteristics of the input element are sufficient to identify a specific browser in a given environment. For this reason, the technique herein is sometimes referred to as "stylistic" fingerprinting. In particular, it has been observed that browsers render DOM elements (such as the text field element) differently depending on their environment. As FIG. 9 depicts, the text field element rendered by a Chrome v96 browser may have up to 332 CSS properties, a Firefox v95 browser may have up to 352 CSS properties, a Safari v15 browser may have up to 390 properties, and so forth for other common browser types.

Further, even the same browser may render a DOM element different depending on the underlying operating system on which the browser executes.

Figure 10:
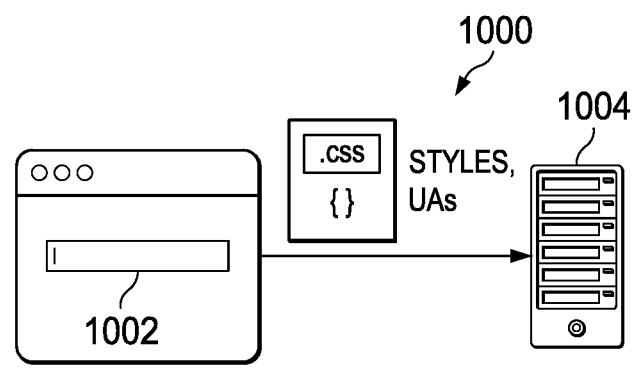
FIG. 10 depicts how stylistic fingerprinting according to this disclosure is used.
Figure 11:
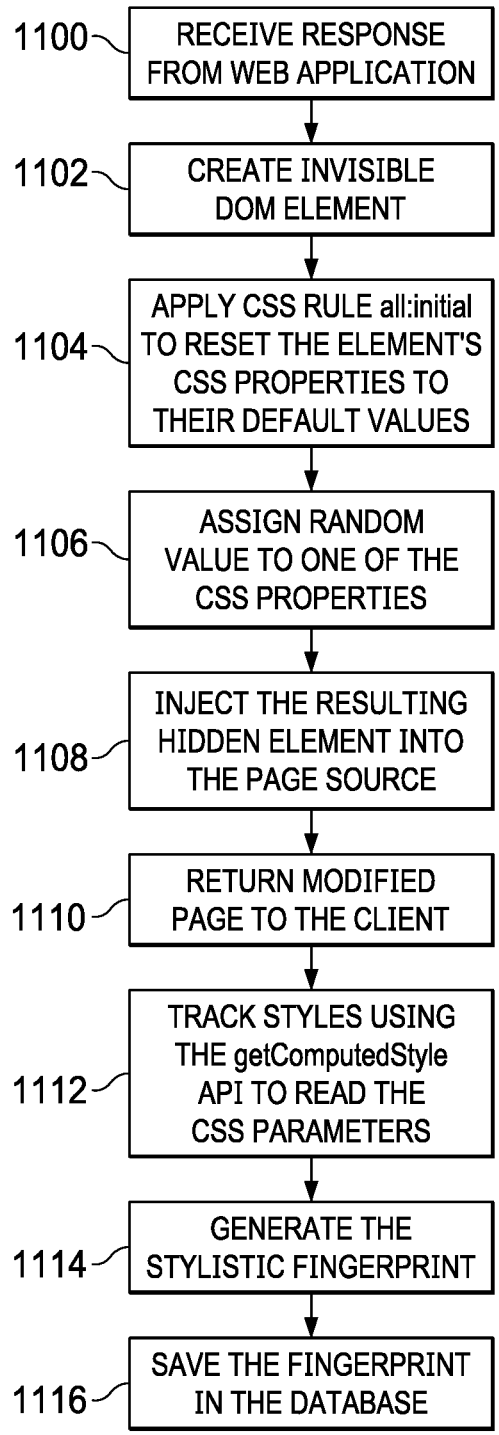
FIG. 11 depicts a process flow detailing how a database of stylistic fingerprints corresponding to a set of client devices is generated during a bootstrap phase.

In the approach herein, and as will be described, a client's actual characteristics are learned (inferred) by extracting the styles associated with a DOM element, such as a text element. This basic approach is depicted in FIG. 10, wherein a set CSS styles 1000 associated with a browser text field 1002 are extracted and used for identification. In a preferred approach, a database 1004 of stylistic fingerprints identifying various devices is created, typically as a bootstrap process (phase). In one embodiment, the database is created, e.g., at a transparent proxy, that monitors web requests to a web application from a diverse set of browser clients (including a diverse set of browser distributions and operating systems). The database bootstrapping process preferably works as follows, and with reference to the process flow in FIG. 11.

At step 1100, a response from the web application (e.g., a login page) is received at the proxy. The follow-on steps then modify the response to include the stylistic dataset. To this end, the proxy is configured at step 1102 to create an invisible DOM element, such as a text field; at step 1104, to apply the CSS rule all:initial to reset the element's CSS properties to their default values; and, at step 1106, assign a random value to one of those properties. By including the random value, the resulting stylistic dataset is unique. At step 1108, the proxy injects the resulting invisible text field element into the response before returning it to the requesting client at step 1110. When the user then interacts with the returned response (page), the reverse proxy tracks the element's styles. In particular, at step 1112, the proxy uses the getComputedStyle API to read the CSS parameters of the <input> element. Because browser size is changeable and the input element preferably is hidden by moving it off screen, the style tracking operation also preferably removes the properties (e.g., inset-block-end, inset-inline-end, etc.) that are affected by browser size and element coordinates, as well as properties that are affected by the location of the element. The result, generated at step 1114, is a stylistic fingerprint representing the particular device that received the stylistic dataset. Typically, the fingerprint comprises detailed information describing the device (e.g., processor type, operating system, browser, browser version, etc.). At step 1116, the proxy saves the set of information identifying the device in association as the fingerprint. During the bootstrap phase, other responses from the web application that pass through the reverse proxy are modified in a similar manner, and the reverse proxy performs similar style tracking, building the database in the process. Thus, and given a diverse set of browser clients (including a diverse set of browser distributions, versions, operating systems, and the like), a set of stylistic fingerprints (representing the identified devices) are generated and saved in the database.

The database may be structured to store the element's styles (i.e., the information obtained from the tracking) directly, or as a set of differences, or in some other convenient manner (e.g., in a hash table). To achieve more efficient mapping (device identification), there may be a stylistic baseline created for each of the various browser types (e.g., Chrome, Firefox, Safari, and the like). The database also may be updated periodically, e.g., as new browser clients are made available.

Figure 12:
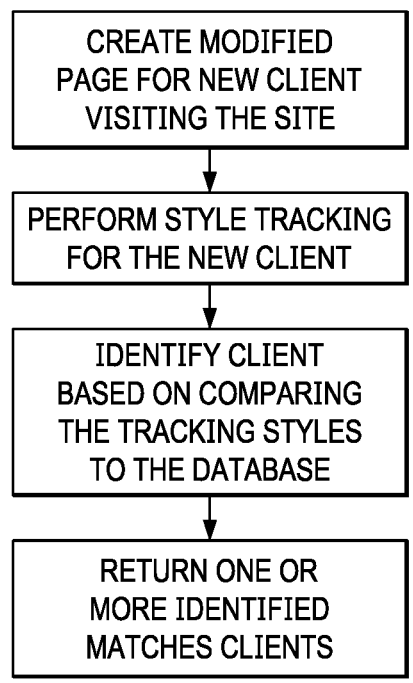
FIG. 12 depicts a device identification operation using the database.

The information saved in the database (the large set of stylistic fingerprints) is then useful for identifying a device when the device visits the page. In particular, and with reference to FIG. 12, when a new client later visits the login page, the page is again modified by the proxy as it is returned to the new client. This is step 1200. At step 1202, the proxy then performs the same tracking operation as described above on the new client. At step 1204, the resulting styles (or some subset thereof) are then used as a lookup into the database to identify the device(s) that match. Preferably, the identified devices are limited to a small number of user agents, typically with the only difference being the browser version, as some successive versions may share stylistic features. At step 1206, an identified match (or set of matches) are returned. These matches identify the device most closely associated to the new client. If no match is found, the database may be updated to include information about the new client.

Once the device is identified (through the stylistic fingerprint, which is robust), preferably the proxy then determines whether the attacker has attempted to spoof device attributes, such as traditional device attributes (e.g., user agent, browser version, OS). To this end, the proxy compares the traditional device attributes (identified, e.g., through known JavaScript fingerprinting APIs) that might have been spoofed to check against the actual values for these attributes, which have been collected during the building of the database. If a spoofing attack on any such traditional device attributes is detected, a given security action may be taken, e.g., blocking the request, issuing a notification, directing the request to a sandbox, serving a CAPTCHA, and the like. The nature of the security action will be policy- or implementation-specific.

Figure 13:
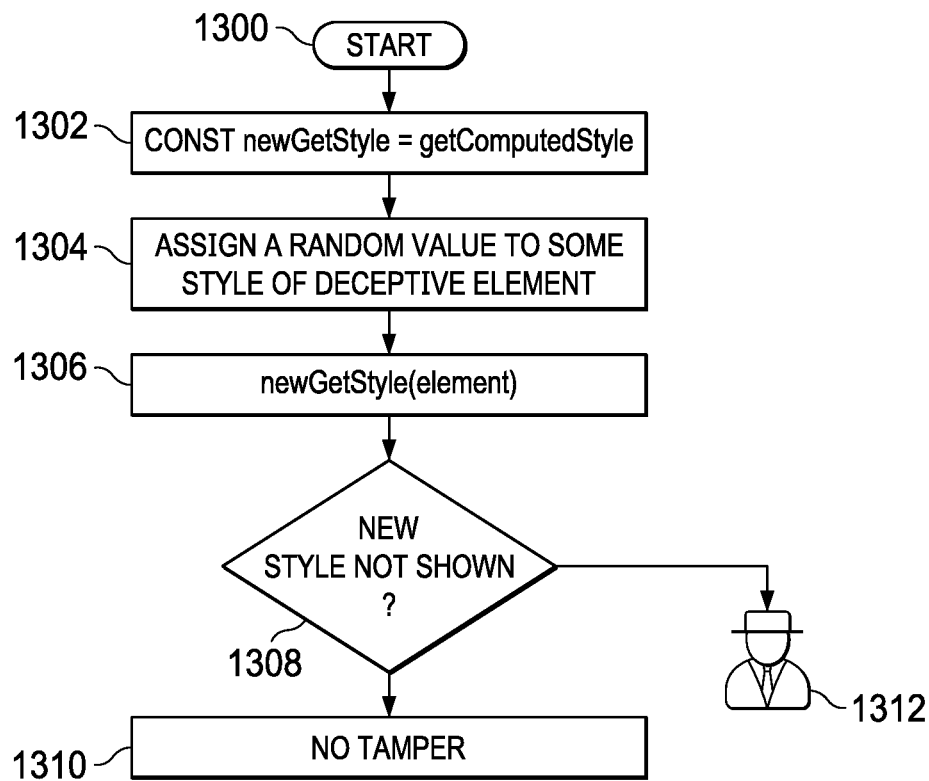
FIG. 13 depicts a style manipulation detection routine.

Stylistic fingerprinting as described also enables the building of a more robust anti-spoofing defense, as it does not rely upon any known fingerprinting APIs. In particular, the technique is robust even if the attacker spoofs styles instead of fingerprinting APIs. This benefit is achieved through the inclusion of a processing routine to detect any such style manipulation. A preferred style manipulation detection routine is shown in FIG. 13.

The routine starts at step 1300. If an attacker wants to override a style, it has to spoof the getComputedStyle API. Thus, at step 1302, a constant (const) copy of this API is made. This creates an immutable closure that cannot be tampered or spoofed. At step 1304, a random value is assigned to some style of an invisible DOM element (i.e., an element that is hidden by visibility property visibility:hidden and being off-screen). As is well-known, the visibility property specifies if/how an element is visible. Every HTML element has a default visibility value. The visibility:hidden property is used here in the event the random value accidentally makes the element visible, and it does not change any other default value. An element that is invisible is preferred, but not necessarily required. Without intending to be limiting, the invisible DOM element is a text field, as has been described. The DOM element (having the random value assigned to a given style) is sometimes referred to herein as a deceptive element. As step 1306, the "new" variable is then used to extract (read) the styles from the text field and determine whether or not the style (associated with the assigned random variable) has been updated. If this is the case, the process can confirm that the getComputedStyle API has not been tampered with. To this end, a test is then performed at step 1308 to determine if at least the random value is found in the results returned. If the new style is detected, no style manipulation has occurred as indicated at step 1310. If the new style is not present, however, then manipulation of the styles has been detected and indicated (as an attack against the getComputedStyle API) at step 1312. Once again, a given security action can then be taken.

Figure 14:
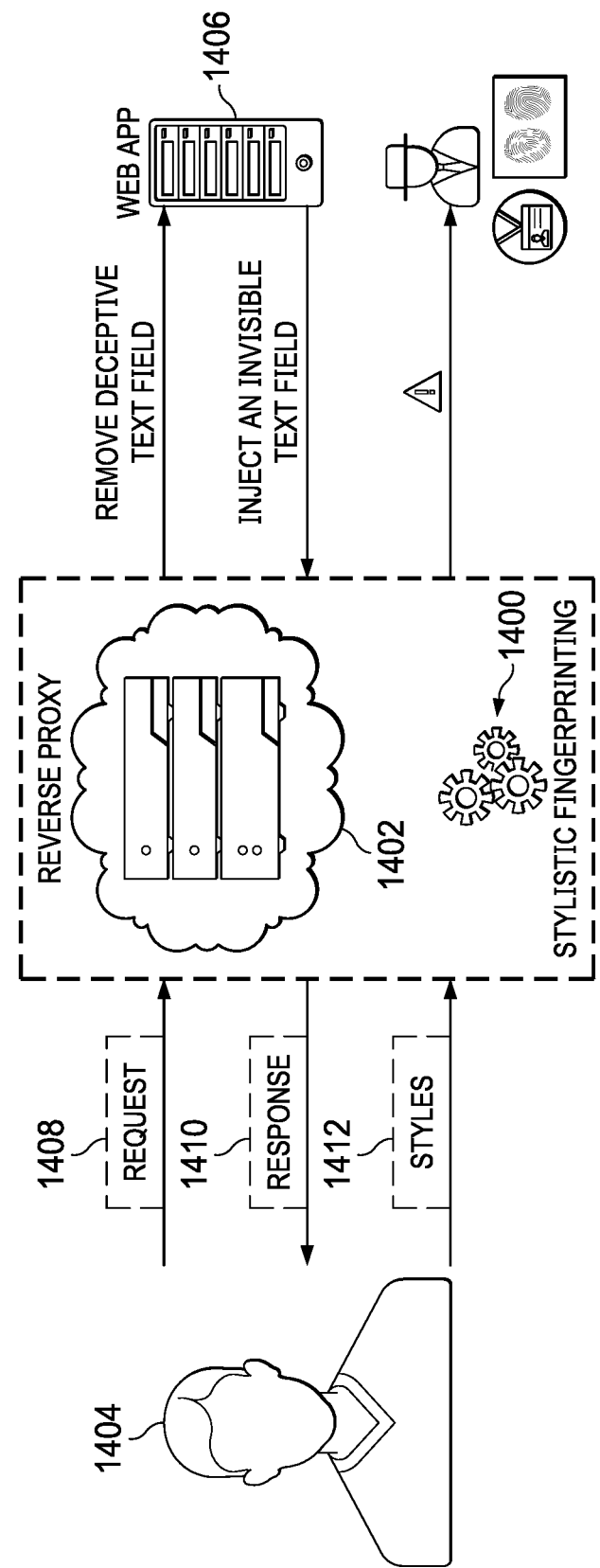
FIG. 14 depicts a representation framework in which the techniques of this disclosure may be practiced.

Referring now to FIG. 14, an exemplary deception framework architecture for stylistic fingerprinting according to this disclosure is depicted. In a typical operating scenario, the technique is implemented without any change in the web application or site that is being protected. The technique also does not depend on the web application framework or language. Instead, the stylistic fingerprinting function 1400 is provided by an intermediary 1402 operating between a client machine 1404, and the server 1406. A preferred operating scenario is a web authentication reverse proxy such as described in FIG. 3, but this is not a limitation, as the technique may implemented in any intermediary device. As has been described, the stylistic fingerprinting function operates by manipulating the requests 1408 received from the end user browser, as well as the responses 1410 returned by the proxy to the user's browser. In a typical scenario, and in response to a request (e.g., for a login page), the server 1406 returns a response intended for the requesting client. As has been described, the reverse proxy intercepts the response. injects the hidden text field, and returns the modified response. The proxy then tracks the styles 1412 used by the client's browser, identifies the device, and identifies any potential spoofing attack, all in the manner previously described.

The technique provides significant advantages. To reveal the device's true identity, a device fingerprinting approach based on the CSS properties of a DOM element (e.g., a text field) is utilized. The approach leverages the notion that browsers render DOM elements differently depending on the environment. Therefore, and by extracting styles, the actual characteristics (such as operating system, browser and browser version) can be learned. The approach also provides a method to prevent style manipulation, making it difficult to spoof stylistic features. The technique has higher entropy than many known device fingerprinting techniques, such as platform, WebGL Renderer, and List of plugins, and it enables the building of a robust anti-spoofing mechanism.

Generalizing, the method for detecting web resources spoofing through stylistic fingerprints according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. As noted, the techniques herein may be practiced in whole or in part in a loosely-coupled server (including a "cloud"-based) environment. The security server itself (or functions thereof, such as the monitor process) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

In a representative embodiment, the stylistic fingerprinting components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular processing environment, but this will be a typical implementation. As noted, the above-described function may be used in any system, device, portal, site, or the like wherein request query syntax may be changed, modified, updated or otherwise altered.

The techniques herein provide for improvements to another technology or technical field, namely, web-based security systems, as well as improvements to the operational capabilities of such systems when used in the manner described.

While the invisible element is preferably a text field, this is not a limitation. Any DOM (or other) element that has associated CSS properties and that is capable of being hidden may be used for the style data collection.

Having described the subject matter, what is claimed is as follows.

The invention claimed is:

1. A method of detecting deceptive web activity operative on an intermediary device located between a client, and a server, comprising performing by the intermediary device the steps of:
   receiving a page directed to the client from the server;
   injecting a Document Object Model (DOM) element having a set of style properties associated therewith, wherein a given one of the set of style properties is assigned a random value, to generate a modified page;
   returning the modified page to the client;
   as the client interacts with the modified page, tracking the set of style properties;
   based on the tracked set of style properties, identifying the client, wherein the client is identified as a specific browser in a given operating environment from a database of information identifying clients; and
   based on the tracked set of style properties, concluding that a spoofing attack has occurred on one or more attributes associated with the identified client if the random value is not found in the tracked set of style properties.

2. The method as described in claim 1 further including taking a given security action responsive to detecting the spoofing attack.

3. The method as described in claim 1, wherein the database of clients is generated in a bootstrap operation at the intermediary device using the injected DOM element that is invisible.

4. The method as described in claim 1 wherein the DOM element is an invisible text field, and the set of style properties are Cascading Style Sheet (CSS) properties.

5. The method as described in claim 1 wherein the one or more attributes include one of: user agent, browser version, operating system, and one or more style properties.

6. The method as described in claim 1 wherein the spoofing attack detects an update to a style within the set of style properties.

7. The method as described in claim 1 further including re-setting the set of style properties to their default values being assigning the random value.

8. An apparatus configured as an intermediary device between a client and a server, comprising:
   a processor;
   computer memory holding computer program instructions executed by the processor to detect deceptive web activity, the computer program instructions comprising program code configured to:
     receive a page directed to the client from the server;
     inject a Document Object Model (DOM) element having a set of style properties associated therewith, wherein a given one of the set of style properties is assigned a random value, to generate a modified page;
     return the modified page to the client;
     as the client interacts with the modified page, track the set of style properties;
     based on the tracked set of style properties, identify the client, wherein the client is identified as a specific browser in a given operating environment from a database of information identifying clients; and
     based on the tracked set of style properties, conclude that a spoofing attack has occurred on one or more attributes associated with the identified client if the random value is not found in the tracked set of style properties.

9. The apparatus as described in claim 8 wherein the program code is further configured to take a given security action responsive to detecting the spoofing attack.

10. The apparatus as described in claim 8 wherein the database of clients is generated in a bootstrap operation at the intermediary device using the infected DOM element that is invisible.

11. The apparatus as described in claim 8 wherein the DOM element is an invisible text field, and the set of style properties are Cascading Style Sheet (CSS) properties.

12. The apparatus as described in claim 8 wherein the one or more attributes include one of: user agent, browser version, operating system, and one or more style properties.

13. The apparatus as described in claim 8 wherein the spoofing attack detects an update to a style within the set of style properties.

14. The apparatus as described in claim 8 wherein the program code is further configured to reset the set of style properties to their default values being assigning the random value.

15. A computer program product in a non-transitory computer readable medium, the computer program product holding computer program instructions executed by a processor in a host processing system configured to detect deceptive web activity, the computer program instructions comprising program code configured to:
   receive a page directed to a client from a server;
   inject a Document Object Model (DOM) element having a set of style properties associated therewith, wherein a given one of the set of style properties is assigned a random value, to generate a modified page;
   return the modified page to the client;
   as the client interacts with the modified page, track the set of style properties;
   based on the tracked set of style properties, identify the client, wherein the client is identified as a specific browser in a given operating environment from a database of information identifying clients; and
   based on the tracked set of style properties, conclude that a spoofing attack has occurred on one or more attributes associated with the identified client if the random value is not found in the tracked set of style properties.

16. The computer program product as described in claim 15 wherein the program code is further configured to take a given security action responsive to detecting the spoofing attack.

17. The computer program product as described in claim 15 wherein the database of clients is generated in a bootstrap operation using the infected DOM element that is invisible.

18. The apparatus as described in claim 15 wherein the DOM element is an invisible text field, and the set of style properties are Cascading Style Sheet (CSS) properties.

19. The apparatus as described in claim 15 wherein the one or more attributes include one of: user agent, browser version, operating system, and one or more style properties.

20. The apparatus as described in claim 15 wherein the spoofing attack detects an update to a style within the set of style properties.

21. The apparatus as described in claim 15 wherein the program code is further configured to reset the set of style properties to their default values being assigning the random value.

* * * * *